United States Patent [19]
Watanabe et al.

[11] 4,328,412
[45] May 4, 1982

[54] MOTOR-DRIVEN WELDING MACHINE

[75] Inventors: Toshihiko Watanabe, Kamakura; Naoki Takenouchi, Chicasaki; Mitsurou Soga; Kouji Kawakami, both of Kamakura, all of Japan

[73] Assignee: Kobe Steel, Ltd., Kobe, Japan

[21] Appl. No.: 125,904

[22] Filed: Feb. 29, 1980

[51] Int. Cl.³ .............................................. B23K 9/00
[52] U.S. Cl. ............................. 219/125.1; 219/121 R; 219/136; 228/25; 280/35
[58] Field of Search .......... 219/121 R, 125.1, 124.31, 219/142, 144; 228/136, 25, 47; 280/35, 638

[56] References Cited

U.S. PATENT DOCUMENTS

| | | |
|---|---|---|
| 2,194,909 | 3/1940 | Moss ................................ 219/121 |
| 2,207,314 | 7/1940 | Staples ................................ 174/7 |
| 2,888,088 | 5/1959 | Claas ................................ 280/638 X |
| 3,162,161 | 12/1964 | Verbeek . |
| 3,201,561 | 8/1965 | Damon . |
| 3,573,425 | 4/1971 | Damon . |
| 3,718,798 | 2/1973 | Randolph et al. . |
| 3,753,525 | 8/1973 | Homes . |
| 3,764,777 | 10/1973 | Sakabe et al. . |
| 3,779,444 | 12/1973 | Kensrue . |
| 3,844,468 | 10/1974 | Nelson et al. . |
| 4,101,755 | 7/1978 | Uratani ................................ 228/45 |
| 4,131,783 | 12/1978 | Kensrue et al. . |

FOREIGN PATENT DOCUMENTS 197177 7/1956 Fed. Rep. of Germany ...... 219/144

OTHER PUBLICATIONS

Cary, "Modern Welding Technology", Prentice Hall, Englewood Cliffs, N. Y., 1979. FIGS. 2-18.

*Primary Examiner*—Elliot A. Goldberg
*Attorney, Agent, or Firm*—Oblon, Fisher, Spivak, McClelland & Maier

[57] ABSTRACT

A motor-driven welding machine capable of holding and carrying a welding torch stably along a welding line, the machine including adjusting means for varying the mounting position of a welding torch or the interaxle distance of carriage wheels according to the type of the welding torch to be held thereon. The machine further includes means for allowing or stopping oscillatory or pivotal movements of the welding torch in horizontal and vertical planes and means for steering the carriage wheels in relation with the oscillatory movements of the torch.

10 Claims, 24 Drawing Figures

MOTOR-DRIVEN WELDING MACHINE

BACKGROUND OF THE INVENTION (1) Field of the Invention

This invention relates to a motor-driven welding machine construction, and more particularly to a motor-driven welding machine which is capable of holding and carrying various types of welding torches stably and in smooth movements.

(2) Description of Prior Art

In the welding operation with a conventional semi-automatic welding machine, for instance, in $CO_2$ welding, the torch is moved manually by an operator along a welding line while keeping the tip end of the torch nozzle at a predetermined distance from the workpiece. This sort of manual welding operation is simple but has an inherent drawback in that it is difficult and toilsome for an operator to move the tip end of the nozzle at a uniform speed and at a constant distance from the workpiece. In fact, it is extremely difficult even for a skilled operator to keep on the manual welding operation satisfactorily over a long time period.

It has already been known in the art to provide a motor-driven wheeled carriage for supporting the welding torch, the carriage usually having one or two wheels (with or without an auxiliary wheel). A welding machine on a single- or two-wheeled carriage is put in travel in the welding operation, dragging a power cable of 2 meters or longer. One problem with such welding machine is that it easily looses its balance due to the dragging resistance of the cable or upon application of a localized load, causing a certain wheel to idle or falling down unless supported by the hand of the operator. The instability of the machine is encourage when a torch of a particular shape which has a center of gravity at a higher level is employed for performing a different welding operation.

Therefore, there has been a demand for a welding machine which is adjustable according to the type and shape of the torch to be supported thereon and which can travel in stable state without yielding to the dragging resistance of the cable and irrespective of the kind of the mounted torch. Of course, the welding machine itself is preferred to be compact and light-weighted and the adjusting machinism to be simple in construction.

SUMMARY OF THE INVENTION

It is therefore an object of the present invention to provide a motor-driven semi-automatic welding machine which is easily to handle and which runs in stable state. A more particular object of the present invention is to provide a motor-driven welding machine which has means for adjusting the mounting position of the torch holder or the inter-axle distance between the front and rear wheels of the carriage according to the type or kind of the torch to be held thereon.

Another object of the invention is to provide a motor-driven welding machine which is adjustable to permit pivotal movements of the welding torch in either horizontal or vertical plane or in both planes depending upon the welding operation to be performed.

A further object of the invention is to provide a motor-driven welding machine employing a torch holder which can adapt itself to nozzle pipes of various diameters.

The motor-driven welding machine according to the present invention basically comprises front and rear wheels mounted in front and rear portion of the machine, at least either the front or rear wheel or wheels being driven from a motor, a vertically pivoting means permitting a welded torch to rotate in a vertical plane across the axis of the machine, an adjusting mechanism for locating the center of a grip portion of the welding torch at a position intermediate between the front and rear wheels, and a holder for holding the welding torch in position on the welding machine.

The welding machine according to the invention has one or more of the following features or advantages.

(1) The torch nozzle is moved at a uniform speed, keeping a constant distance (extension) from the surface of the workpiece, so that a satisfactory weld can be obtained even when the machine is handled by an unskilled operator.

(2) Continuous welding operation is possible over a long time period without imposing much burden on the part of the operator.

(3) The position of the center of the grip of the hand torch or its center of gravity relative to the drive wheels or steering guide wheels is adjustable according to the kind or shape of the torch to ensure stable and smooth travel of the machine and to adapt the machine to various welding operations.

(4) Due to the stable movement of the carriage which conveys the torch, a long weld of satisfactory quality can be formed easily without experiencing disturbances of the bead which would otherwise be caused by the movements of the operator's body.

(5) The torch holding carriage is provided with a steering mechanism following the oscillatory movements of the torch to steer the machine along the welding line. In addition, the steering wheels are connected to the weaving mechanism of the torch to steer the machine according to the weaving operation, which is an ideal control for butt welding.

(6) The switching to and from the downhand horizontal fillet welding as well as the handling for oscillatory operation is extremely easy.

BRIEF DESCRIPTION OF THE DRAWINGS

The above and other objects, features and advantages of the present invention will be apparent from the following description and the appended claims, taken in conjunction with the accompanying drawings which show by way of example preferred embodiments of the present invention and in which:

DESCRIPTION OF PREFERRED EMBODIMENTS

Referring to FIGS. 1 through 4, there is shown a motor-driven welding machine according to the present invention. The welding machine includes a torch 1 with a grip portion 4 which is connected to a cable 5 and has a nozzle pipe 7 attached to the front end thereof. The grip portion 4 is provided with a switch 6 for turning on and off the arc. The nozzle pipe 7 is fixed by a screw 9 in a torch holding member 8 which is slidably mounted on a bracket of a lift member which will be described herinlater. The torch 1 is held on and transferred by a carriage which is constituted by a drive portion 2 and a torch mounting portion 3. The drive portion 2 includes a frame 10 which accommodates therein a drive motor 11 (FIG. 4), the motor 11 being supplied with power through a flexible cord (not shown). A pinion 11' which is mounted on the output shaft of the motor 11 is meshed with a gear 12' on a drive shaft 12 which is in turn rotatably supported on the frame 10, thereby to rotate wheels 13 which are mounted in the opposite end portions of the drive shaft 12. Indicated at 14 and 14' are top and bottom cover plates with mounting holes. The frame 10 of the drive portion 2 is made of a material of a greater wall thickness and designed to press the wheels 13 against the running surface.

Figure 6:
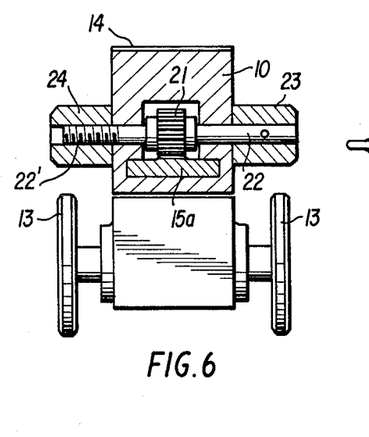
FIG. 6 is a sectional view taken on line VI—VI of FIG. 1.
Figure 8:
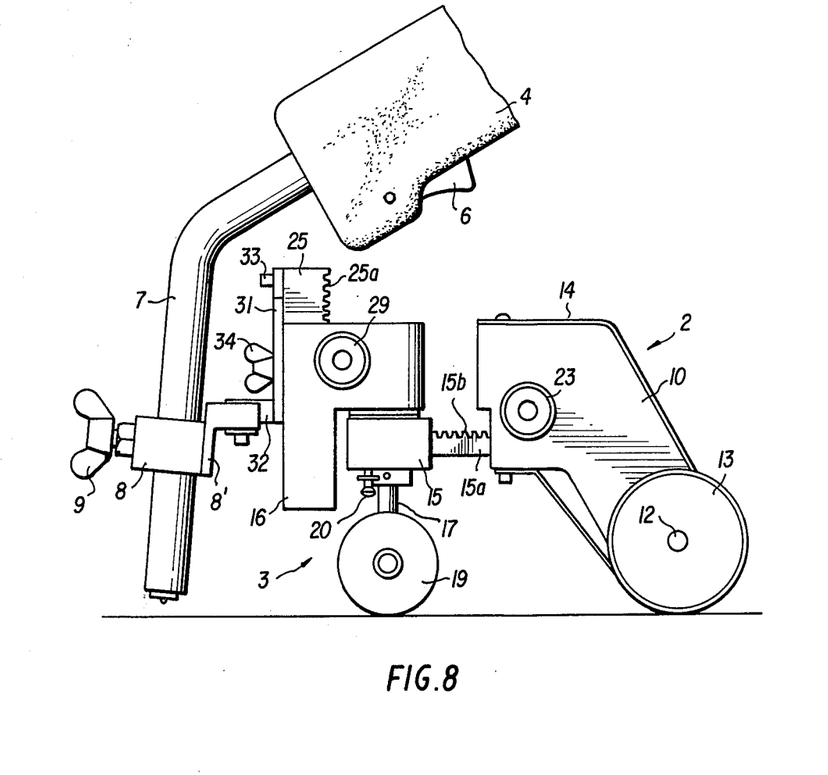
FIG. 8 is a view similar to FIG. 1 but showing the machine in extended position.

On the other hand, the torch mounting portion 3 is constituted by a front wheel support member 15 and a swivel member 16 which is rotatably supported on the support member 15. The front wheel support member 15 is preferred to be slidable into and out of the frame 10 of the drive portion 2 and adjustably fixed in a suitable position, for example, by a pair of support rods which are fixed to a support member 15. The support rods are loosely received in fitting holes in the frame 10 and fixed in position by set-screws which are provided on the frame 10. Alternatively, a rack 15b is provided on a support arm 15a which is formed integrally with the support member 15 as shown in FIGS. 6 and 8, the rack 15b being received in a groove which is provided in the frame 10 for meshing engagement with a pinion 21. The pinion 21 is fixedly mounted on a transverse shaft 22 which extends through the frame 10 and which is provided with a turning handle 23 fixedly at one end thereof and has a clamping handle 24 threaded on the other end 22'. The position of the support member 15 relative to the frame 10 is thus adjustable by turning the handle 23 and fixable by tightening the clamping handle 24 which clamps the pinion 24 against one side wall of the frame 10. The adjustment and handling of the support member 15 is thus very simple.

Loosely fitted into the front wheel support member 15 of the above-described construction is a front wheel support column 17 which securely supports at its lower end a front wheel axle 18 (FIG. 3) with front wheels 19 at the opposite ends thereof. The front wheel support column 17 is provided with set hoops 17a and 17b in abutting engagement with the upper and lower sides of the support member 15, respectively, thereby restricting the height of the front wheels 19. Therefore, the load on the front side of the drive portion 2 is supported by the upper surface of the set hoop 17b through the support member 15, the upper surface also serving as a slide surface when the column 17 is rotated for steering the front wheels 19. The upper end portion of the column 17 which projects above the set hoop 17a is fitted into a vertical bore in the swivel member 16 so that the latter is supported on the upper surface of the set hoop 17a for swivelling movement by sliding contact therewith. The support member 15 is provided with a vertical through hole for receiving a locking knob 20 which is biased by a coil spring to have its one end urged to abut constantly on the upper surface of the set hoop 17a. The set hoop 17a is formed with a locking hole at a position which meets the projected end of the locking knob 20 when the front and rear axles 12 and 18 become parallel with each other. The knob 20 is associated with a stopper which is adapted to hold the knob 20 in retracted position when the latter is pushed down and rotated. When the knob 20 is held in the retracted position by the stopper, the support member 15 and set hoop 17a are freely rotatable to turn the front wheels 19 into the steered direction. Instead of the knob 20, there may be provided on the outer periphery of the support member 15 a stopper screw which is adapted to lock column 17 without blocking rotation of the swivel member 16 or other means which locks the set hoop and support member 15 to each other.

Figure 2:
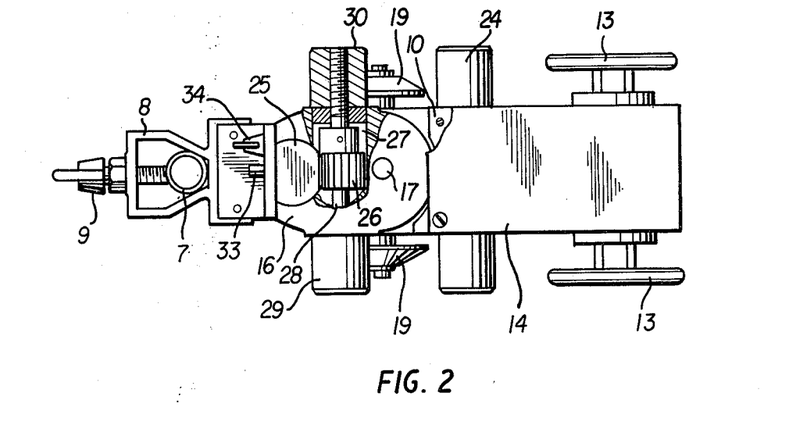
FIG. 2 is a horizontal section taken on line II—II of FIG. 1.
Figure 3:
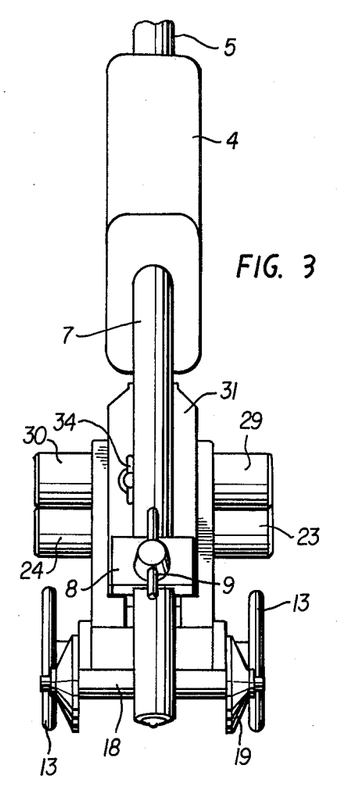
FIG. 3 is a front end view as seen from the left in FIG. 1.
Figure 4:
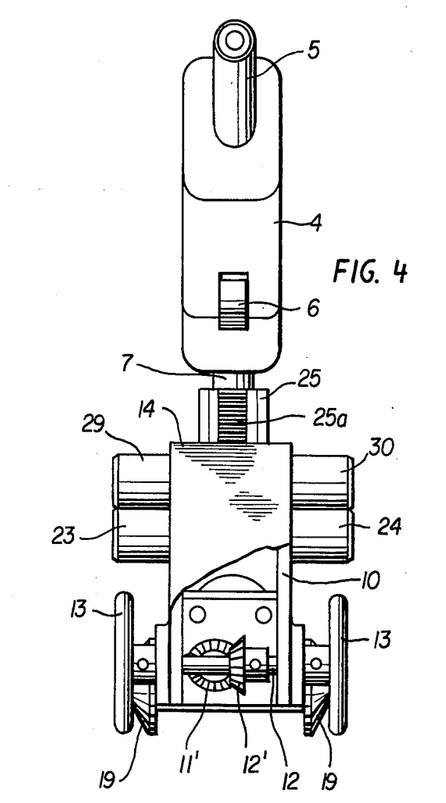
FIG. 4 is a partly cutaway rear end view as seen from the right in FIG. 1.
Figure 5:
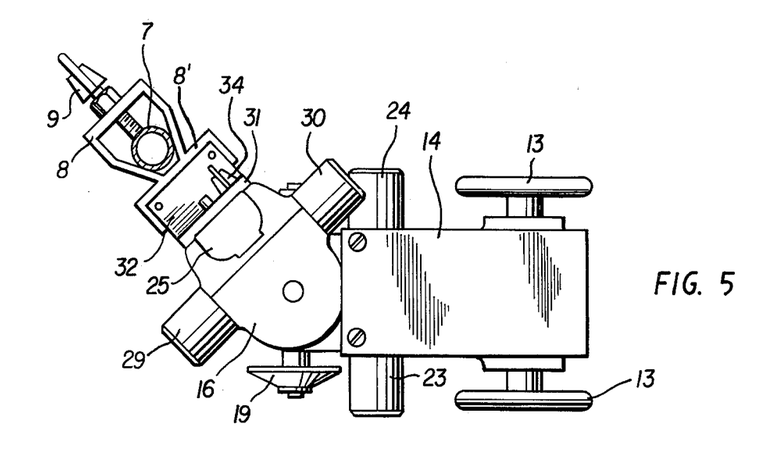
FIG. 5 is a view similar to FIG. 2 but showing the torch in oscillated position.

The swivel member 16 is rotatably fitted on the projected upper end portions of the column 17 for swivelling movement on the set hoop 17a . Although not shown in the drawings, a similar locking knob may also be provided on the swivelling member 16 for engagement with the column 17 or with the set hoop 17a which is fixed on the column 17. Similar locking action may be attained by the use of the locking hole which is formed in the set hoop 17a or by means of the locking knob 20 of the front steering wheels 19. The swivelling member 16 is formed in an elliptical shape as shown in FIG. 2 and freely rotatable about the support column 17. The swivelling member 16 is provided with a downwardly extending slide groove in its outer end face for slidably receiving a lift member 25. The lift member can be formed in various shapes in section, for example, in a circular shape as in the particular embodiment shown in the drawings. The slide groove is opened on the outer side, forming a slit along the outer end of the swivelling member 16. The lift member 25 is provided with a rack 25a on its back side for meshing engagement with a pinion 26 which is partly exposed into the slide groove. The pinion 26 is fixedly mounted on a transverse shaft 28 which is rotatably supported in the swivelling member 16 across a cavity 27 which is formed in communication with the slide groove to accommodate the pinion 26. Similarly to the support member 15, the shaft 28 has a turning handle 29 secured to one end and a clamping handle 30 threaded on the other end thereof. Therefore, if the handle 29 is turned with the clamping handle 30 in loosened state, the lift member 25 is moved up and down as desired. Upon tightening the clamping handle 30, the pinion 26 is pressed to one side wall of the cavity 27 or the handle 29 is pressed against the swivelling member 16 thereby blocking the rotation of the shaft 28 to hold the lift member 25 at an adjusted level. This adjusting and locking means is advantageous since the lifting and locking operations are performed by the use of a single shaft.

Figure 11:
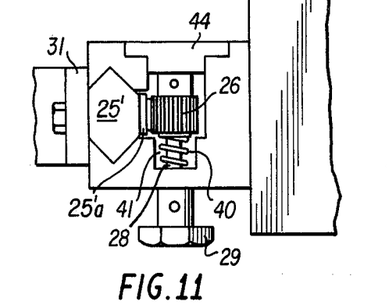
FIG. 11 is a plan view showing an example of pinion braking mechanism.
Figure 12:
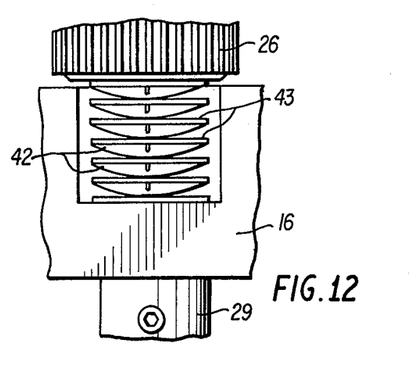
FIG. 12 is a plan view showing another example of pinion braking mechanism.

FIG. 11 illustrates a pinion braking means which employs, instead of the clamping handle 30, a compression spring 40 mounted on the pinion shaft 28 within a cavity 41 which is provided in the swivel member 16 on the side of the turning handle 29, braking the rotational movement of the pinion 26 by the resilient force of the compression spring 40. In this case, the turning handle 29 has to be rotated against the contact friction between the coil spring 40 and pinion 26 but this can be done without troubles as the turning handle 29 is provided in a large diameter. In addition, the pinion 26 which has a small number of teeth can be fixed relative to the lift member 25 by a small braking force. FIG. 12 illustrates an example in which a number of apertured leaf springs 42 are mounted on the pinion shaft 28 in compressed state between seat plates 43 to exercise a similar braking effect on the pinion 26. In the arrangement of FIGS. 11 and 12, the end of the pinion shaft 28 away from the turning handle 29 is supported in a bearing plate 44 which is fitted to close the cavity 27.

Figure 9:
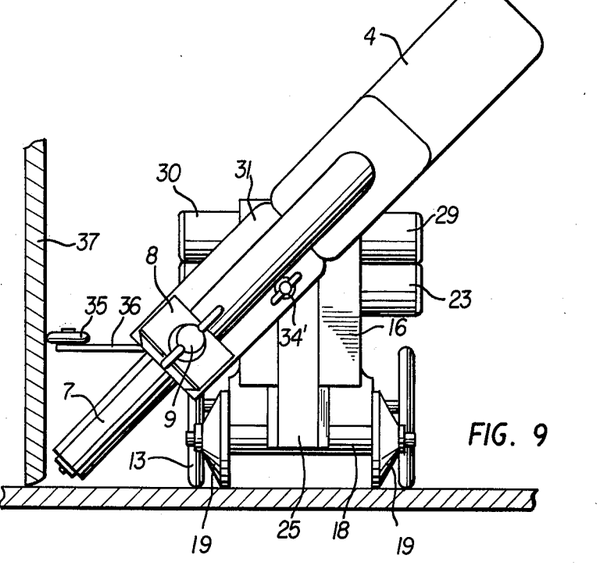
FIG. 9 is an end view of a welding machine with guide wheels.

The outer side of the lift member 25 opposite to the rack 25a is protruded slightly out of the slit at the outer end of the swivelling member 16, and a bracket 31 is fixed on the protruded outer side of the lift member 25 for mounting the afore-mentioned torch holder 8 for the nozzle pipe 7. For attaching the bracket 31, its upper portion is firstly appended on the lift member 25 by a mounting screw 33 and then a butterfly screw 34 is threaded into position to restrict inclination of the bracket 31. The butterfly screw 34 is threaded into a screw hole on the lift member 25 through one of through holes which are provided in the bracket 31. Therefore, the bracket 31 can be retained in a vertical position or in a tilted position by selecting a suitable one of the through holes in the bracket 31 (FIG. 9).

Figure 7:
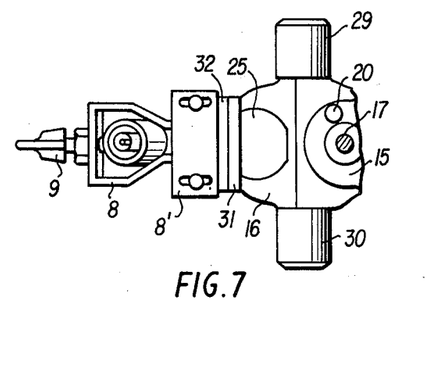
FIG. 7 is a fragmentary bottom view of the same machine.
Figure 10:
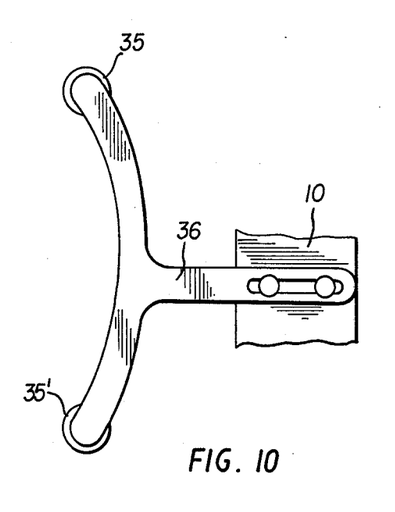
FIG. 10 is a bottom view of the guide wheels and associated component parts.
Figures 13, 14:
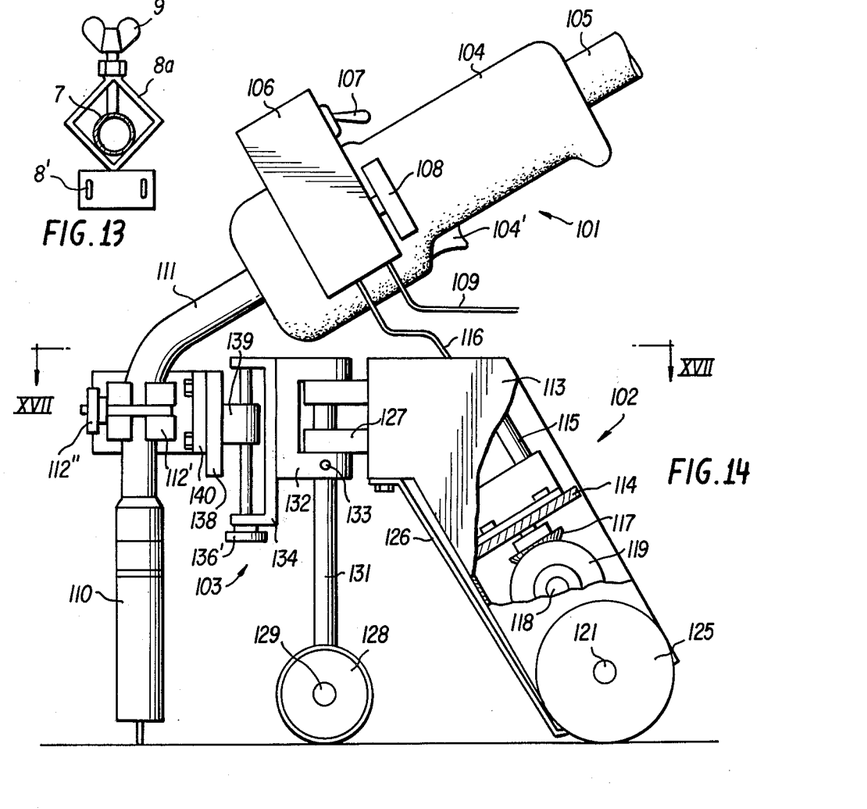
FIG. 13 is a plan view of a modified torch holder.
FIG. 14 is a side view of another embodiment of the invention.
Figure 15:
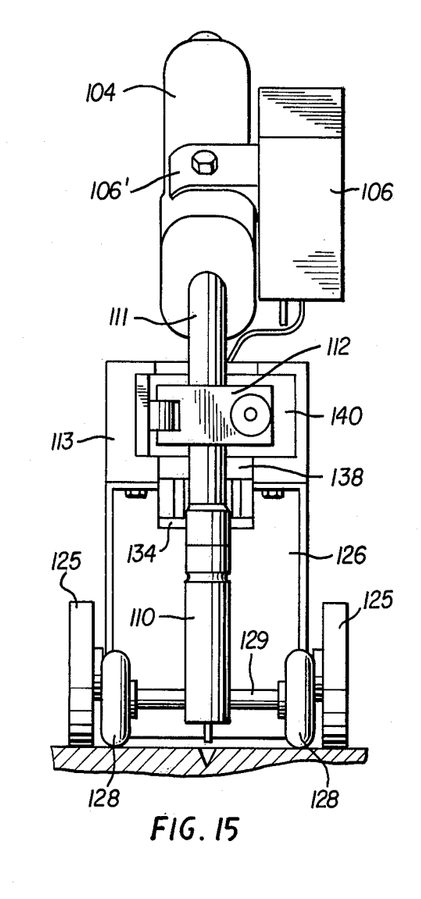
FIG. 15 is a front view of the welding machine of FIG. 14.
Figure 16:
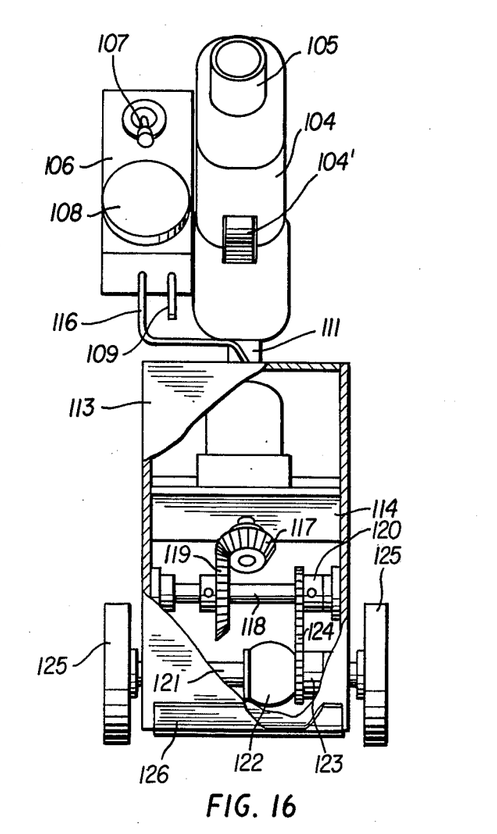
FIG. 16 is a rear view of the same machine.
Figure 17:
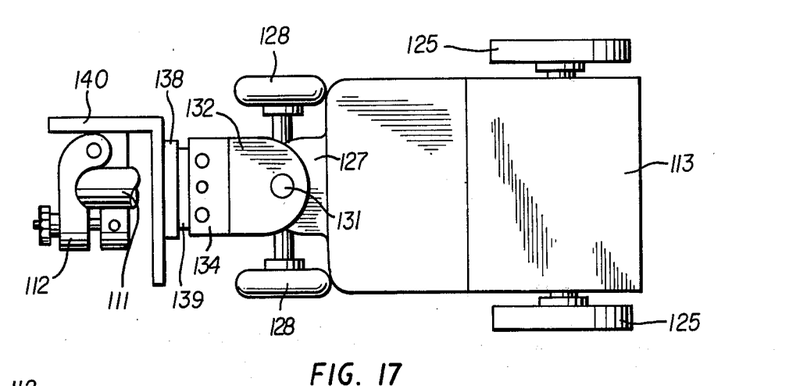
FIG. 17 is a horizontal section taken on line XVII—XVII of FIG. 14.

The bracket 31 is integrally or separately provided with a mounting portion 32 in the lower portion thereof for attaching a nozzle pipe holder 8. The nozzle pipe holder 8 may be of any suitable form but preferred to employ a polygonal ring which is designed to support the nozzle pipe 7 at three points on the circumference thereof while clamping same at one of the three points as shown in FIGS. 2 and 13 so that the holder is adaptable to nozzle pipes of various diameters. The holder 8 is provided with an L-shaped link portion 8' to be attached to the mounting portion 32 of the bracket 31. The holder 8 is fixable to the mounting portion 32 of the bracket 31 and it is also slidably therealong for adjusting purposes, the sliding length of the holder 8 being determined by the length of the mounting portion 32. In the particular embodiment shown, the link portion 8' is provided with side walls which are arranged to embrace the opposite sides of the mounting portion 32. However, it is also possible to attach the side walls on a notched plane to make the rotation of the holder 8 adjustable or to interpose another bracket to adjust the inclination and mounting position of the holder 8. As seen in the bottom view of FIG. 7, the link portion 8' is provided with elongated slots to allow adjustment of the distance between the holder 8 and the lift member 25 and thus the distance between the torch holder 8 and front wheels 19. In a case where the welding machine is used for fillet welding, the bracket 31 which is appended on the lift member 25 is fixed in a tilted position to hold the nozzle pipe 7 aslant as shown in FIG. 9. In fillet welding, it is recommended to provide a guide means which guides the machine along an upright plate 37. For example, the guide means may be constituted by an arm 36 which is adjustably attached to the underside of the frame 10 and which supports idling guide rollers 35 and 35' at bifurcated outer ends thereof as shown in FIG. 10. The arm 36 is shown as being constituted by a single structure but it may be added with other components which are arranged to adjust the positions and inclination of the guide rollers 35 and 35' relative to the line of travel of the welding machine.

Figure 1:
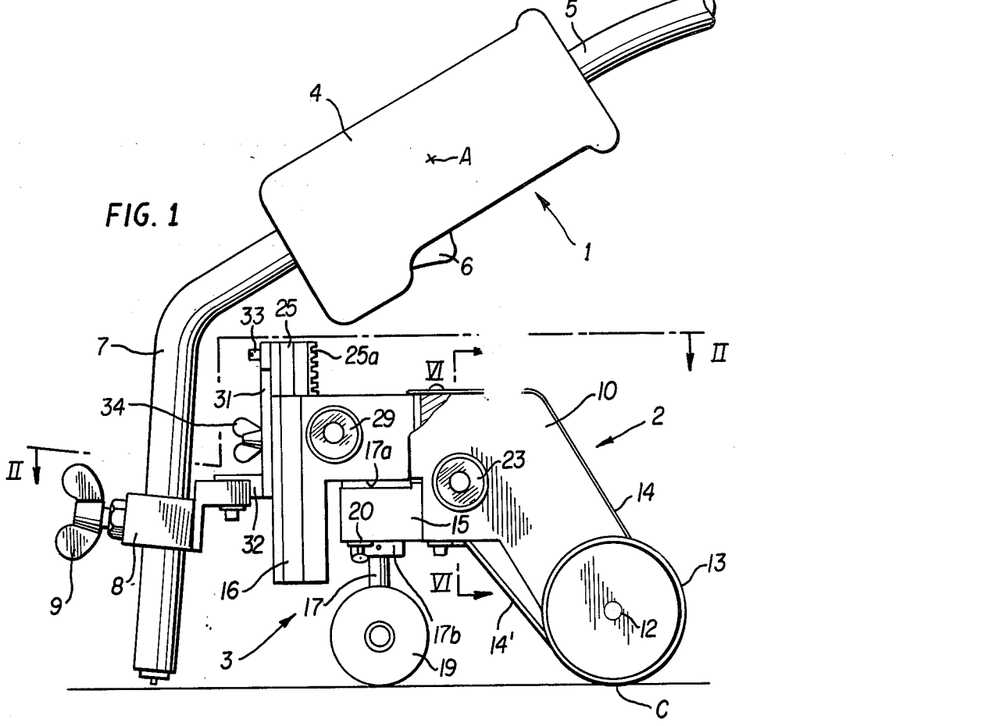
FIG. 1 is a side view of a motor-driven welding machine embodying the present invention.

With the motor-driven semi-automatic welding machine of the above-described construction, the distance between the front and rear wheels 19 and 13 can be adjusted depending upon the kind of the torch to be held on the machine. It is also possible to adjust the distance between the torch holder 8 and the front wheels 19. In a case using a torch as shown in FIG. 1, it has been experimentally confirmed that the welding machine can be put in stable travel when the foot of perpendicular from the center A of the grip 4 is located closer to point of ground contact B of the front wheels 19 than the point of ground contact C of the rear wheels 13 by 30 to 40% of the distance between the two ground contact points B and C. The location of the center A of the grip 4 is varied by alterations in the shape of the nozzle pipe 7 or by alterations in the mounting position of the grip 4 or in the attaching position of the nozzle pipe 7 and the holder 8. However, the welding machine of the present invention is adjustable to alter the interaxle distance to cope with the changes in the location of the grip center, thereby ensuring extremely stable travel of the machine.

Referring now to FIGS. 14 to 24 which shown modified embodiments of the invention, the welding machine is constituted likewise by a welding torch 101, a drive portion 102 and a torch mounting portion 3 (FIG. 14). In this modification, a switch box 106 is mounted on the grip 104 which is connected to a cable 105 and provided with a trigger switch 104' as in the foregoing embodiment. The switch box 106 includes a switch 107 for actuating and switching the travel direction of the carriage, and a knob 8 for adjusting the travel speed. An angular nozzle pipe 111 with a nozzle 110 at its distal end is attached to the lower end of the grip 104 and detachably attached to the front side of the torch mounting portion 103 by means of a torch clampler 112. The switch box 106 is connected with a low voltage power cord 109 and a carriage driving power cord 116 and attached in position on the grip 104 by way of a mounting plate 106' which is fixed to the grip 104 by a screw.

The drive portion 2 is constituted by a motor-driven carriage with a pair of front steering wheels 128 and a pair of rear drive wheels 125. If desired, either the front steering wheels 28 or the rear driving wheels 25 may be replaced by a single wheel. The drive axle 121 of the rear wheels 125 has its opposite ends rotatably supported in a frame 113 which houses a drive mechanism. The drive mechanism may be constituted by a known arrangement, for example, a low voltage DC motor 115 which is mounted on a beam 114 of the frame 113 and a transmission mechanism which transmits power to the drive axle 121. In the particular example shown, the transmission mechanism includes a bevel gear 117 fixedly mounted on the output shaft of the motor 115, a bevel gear 118 meshed with the bevel gear 117 and fixedly mounted on a counter shaft which is rotatably supported on the frame 113, and a chain 124 applied on a sprocket wheel 120 which is fixedly mounted on the counter shaft 118 and a sprocket 123 of a differential unit 122 which is provided on the drive axle 121. The rear drive wheels 125 which are rotated with the drive shaft 121 are suitably provided with a resilient friction material around the circumferences thereof. Indicated at 126 is a heat shielding cover plate.

Figure 22:
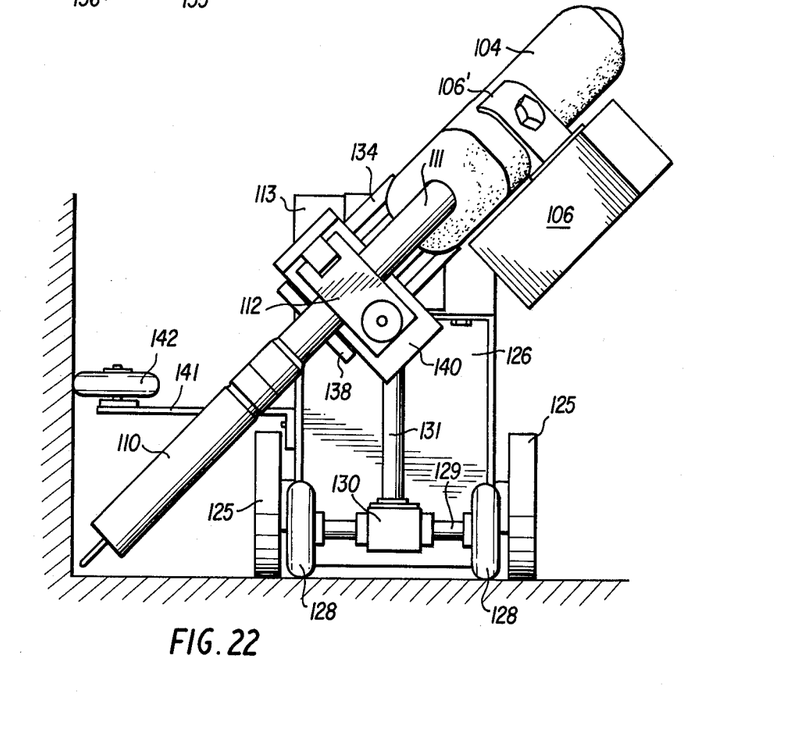
FIG. 22 is a view similar to FIG. 15 but showing the machine as provided with guide wheels and in a different position.

The frame 13 which encases the drive mechanism is provided with pivoting link portions 127 securely on its front wall, the pivoting link portion 127 being loosely fitted on a support column 131 of the front steering wheels 128. Each one of the front wheels 128 has a spherical tread face to facilitate its steering and is fixedly or loosely mounted on an axle 129 which is fixedly or loosely supported in a bearing 130 at the lower end of the support column 131 (FIG. 22). Thus, the front wheels 128 can be steered into a desired direction by turning the support column 130. In order to allow free rotation for steering purposes, the support column 131 is loosely fitted in the pivoting link 127 of the frame 113. A set hoop 148 may be fixed on the support column 131 and within a split groove of the pivoting link portion 127 (FIG. 23) to allow free rotation of the support column 131 while stably supporting the drive portion 102.

Figure 21:
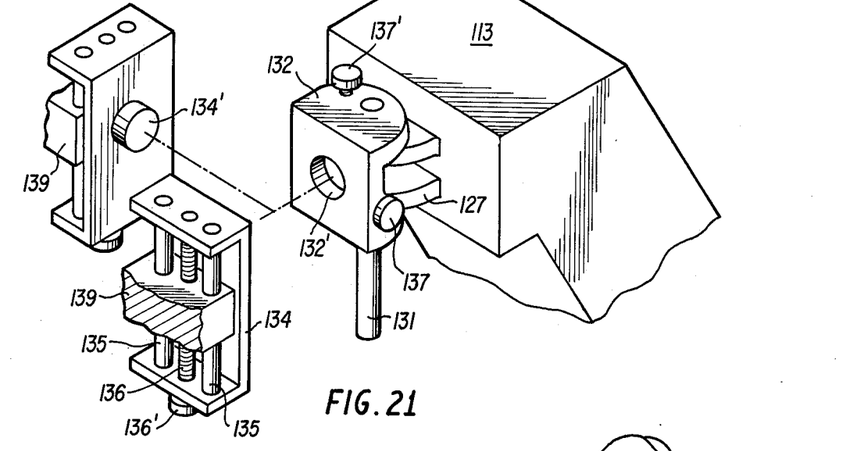
FIG. 21 is a development of a modified torch mounting portion.

The torch mounting portion 103 includes a pivoting bracket 132 which is provided on the link portion 127 of the frame 113 pivotally about the steering support column 131, a slide guide 134 which is fixed on the pivoting bracket 132, and a slider 138 which is slidable up and down along the slide guide 134. A bracket 140 with the afore-mentioned torch clamper 112 is attached to the slider 138. The bracket 140 and slider 138 are connected to each other fixedly or adjustably to hold the bracket 40 in a number of rotationally displaced positions. In the particular example shown, the bracket 140 is fixedly connected to the slider 138. The slider 138 is integrally provided with a slide portion 139 which is slidably fitted on guide rods 135 of the slide guide 134 and threaded on a screw rod 136 which is located between and parallel with the guide rods 135. The slide portion 139 is thus slidable up and down by rotating the screw rod 136 (FIG. 21). Indicated at 136' is a knob which is provided at the lower end of the screw rod 136.

Figure 18:
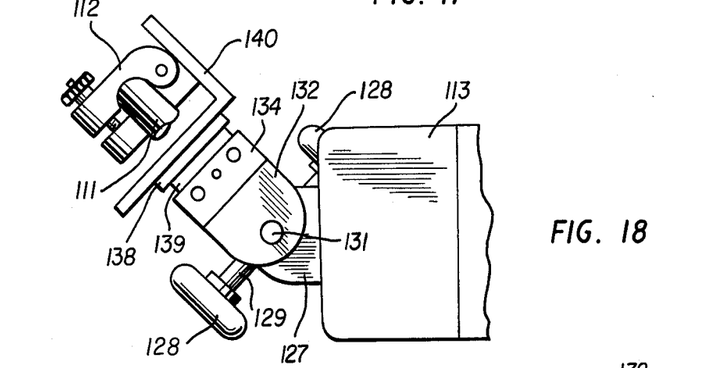
FIGS. 18 and 20 are views explanatory of operations of the welding machine of FIG. 17.
Figures 19, 20:
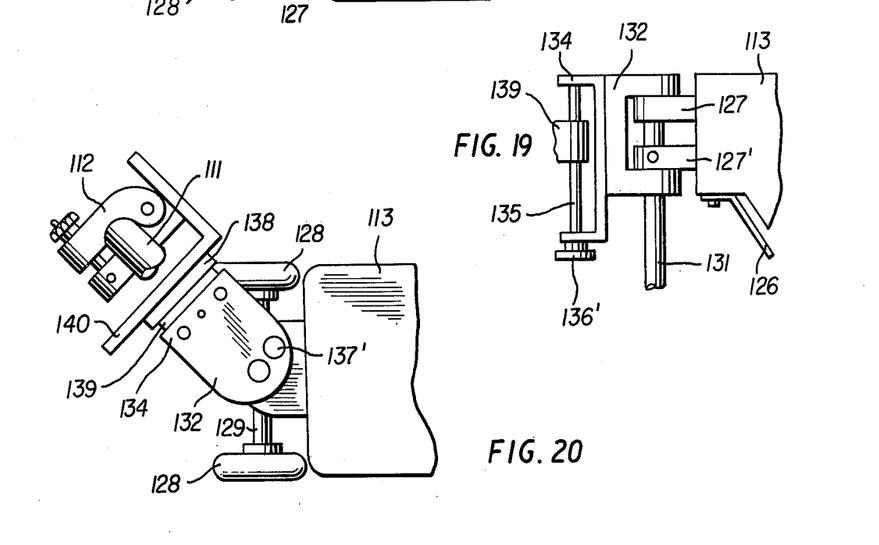
FIG. 19 is a fragmentary view of a modified fixing means.

With the torch mounting portion 103 thus constructed, it is possible to make fine adjustment of the distance between the distal end of the torch nozzle 110 and the base material. The bracket 132 which is supported on the pivoting link portion 127 is freely rotatable about the support column 131 and fixable to the latter by a stop screw (FIG. 14) to support the torch 101 rotatably about the support column 131. In this instance, the rotation of the torch 101 causes the support column 131 to rotate to steer the front wheels 128 as shown in FIG. 18. In other words, the front wheels are steered in such a manner as to follow the movements of the torch. When there arises a necessity in butt welding for fixing the torch mounting portion 103 in an upwardly rotated position as shown in FIG. 20 to form a weld above the traveling surface of the carriage 102, it is possible to provide a stop screw 127' on the pivoting link portion 127 (FIG. 19) to hold the pivoting link portion 127 and front wheels 128 in a particular positional relationship with each other, allowing free pivoting movement of the bracket 132 alone. When it becomes necessity for holding the bracket 132 in a fixed position, the bracket 132 and support column 131 are fixed to each other in a particular positional relation by the stop screw 133 or a clamp screw 37' which is provided on top of the pivoting bracket 132, leaving in a freely rotatable state the torch 101 alone (FIG. 20).

With the welding machine thus constructed, the welding torch 101 which is handled by an operator can pivot in a horizontal plane alone and is mainly useful for downhand welding, performing the weaving operation only in a horizontal plane. However, in welding operation by semi-automatic welding machine, it is required in some cases to turn or oscillate the welding torch in a verticl plane. This requirement can be fulfilled by pivotally connecting the torch clamper 112 to the bracket 140. However, in order to permit application to horizontal fillet welding and to have a torch which is fixedly oscillatable in a vertical plane, it is recommended to constitute the pivotal joint by the slide guide 134 and bracket 132. The welding machine of the present invention includes vertical pivoting or oscillatory means which is fixable at a desired position, as shown in FIG. 21.

Referring to FIG. 21, the slide guide 134 is provided with a projection 134' on the back side thereof. The projection 134' is fitted into a hole 132' on the bracket 132 so that the slide guide 134 is freely rotatable within the hole 132'. The bracket 132 is provided with a stopper screw 137 for clampingly fixing the slide guide 134 at a desired position whenever necessary. Therefore, when the stopper screw 137 is in loosened state, the welding torch 101 is freely rotatably in both vertical and horizontal planes. Of the fixing means which fasten these pivoting components in particular positions, the stopper screw 127' which stops horizontal pivoting movements is herein referred to as first fixing means and the stopper screw 137 which stops vertical pivoting movements as second fixing means. One or both fixing means are used in fastened or loosened state depending upon the operations to be performed by the machine. In this connection, it is recommended to provide a locking hole or groove on the circumference of the projection 134' of the slide guide 134 for engagement with the stopper screw 137.

FIG. 22 illustrate the welding machine as used for horizontal fillet welding. In this case, the slide guide 134 is fixed in a tilted position by fastening the first and second fixing means. Fine adjustment of the nozzle position is possible by way of the slide guide 134. For fillet welding, it is recommened to provide a guide roller 142 for guiding the carriage 102 along an upright or side plate. The guide roller 142 is rotatably mounted at the distal end of an arm 141 which is supported on the frame 113 of the carriage 102. In order to effect weaving with the torch 101 thus positioned, a play is provided in the first and second fixing means, for example, by engaging the stopper screws with larger locking holes or stepped walls.

When the torch is pivoted in a vertical plane, the front steering wheels 128 should preferably be directed in the direction of the pivotal movement. Especially in a fillet welding operation using a guide roller as shown in FIG. 22, the operation can be effected in an extremely stable state by steering the drive carriage 102 such that the guide roller 142 is constantly in contact with the workpiece. For this purpose, the front steering wheels 128 which are caused to follow the vertical pivoting movement should be simultaneously turned toward the upright plate. To this end, various means are conceivable but in any case such steering means should be of simple construction and allow changes in displacement ratio in a wide range.

Figure 23:
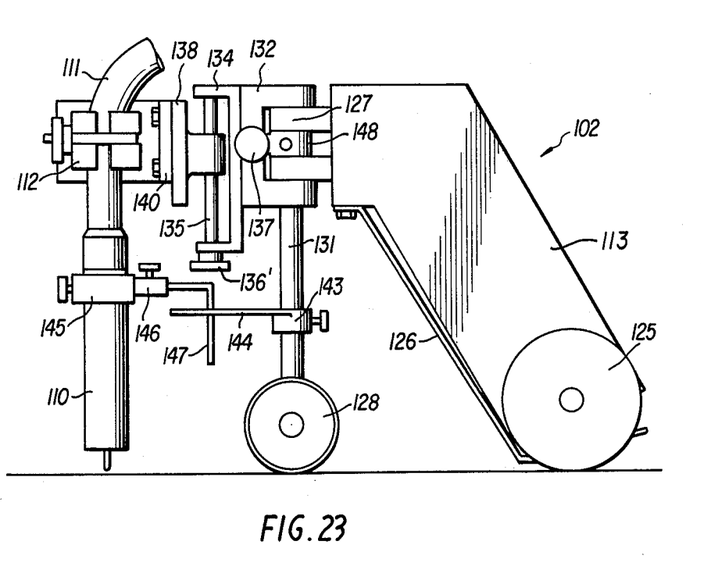
FIG. 23 is a side view of another modification according to the invention.

FIG. 23 shows one example of the steering means which turns the front steering wheels 128 following both vertical and horizontal oscillatory movements of the torch 101. The steering means includes an annular ring 145 fitted on the nozzle 110 and having a socket pipe 146 for supporting an L-shaped steering bar 147. On the other hand, a mounting seat 143 is fixed on the front wheel support column 131 which is in freely rotatable stae, the mounting seat 143 fixedly supporting thereon a slitted arm 144, receiving the steering bar 147 in the slitted end of the arm 144. The slitted arm 144 is made of a sheet-like material while the L-shaped steering bar 147 is in the form of a round rod, so that the front wheels are steered correspondingly to the horizontal oscillatory movements of the torch 101 and simultaneously turned in relation with the vertical oscillatory movements of the torch 101 by sliding contact of the L-shaped steering bar 147 with the slitted arm 144. The turning angle of the front wheels 128 adjustable freely by varying the contacting point of the steering bar 147 with the slitted arm 144 on the mounting seat 143.

Figure 24:
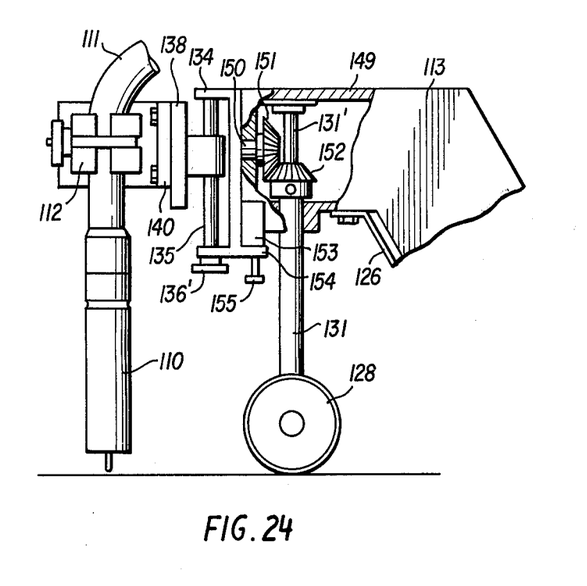
FIG. 24 is a partly cutaway side view of still another modification.

If necessary, there may be provided a steering mechanism which is directly coupled with a torch which is permitted of vertical gyratory movements alone. FIG. 24 illustrates an example of such directly coupled steering mechanism, in which a casing 149 is provided on the upper front side of the frame 113, rotatably supporting the front wheel support column 131 which has a smaller-diameter portion 131' in its upper end portion. Instead of the projection 134' of FIG. 21, a shaft 150 is fixedly mounted on the back side of the slide guide 134 which constitutes the torch mounting portion, the shaft 150 extending through the front end wall of the casing 149 and fixedly mounting thereon a bevel gear 151. The bevel gear 151 is meshed with a bevel gear 152 which is fixedly mounted on the smaller-diameter portion 131' of the rotatable support column 131. With this steering mechanism, the slide guide 134 is pivoted along with the torch 1 to turn the front wheels 128 correspondingly through the bevel gears which are toothed according to a predetermined turn angle ratio. In this instance, the second fixing means is constituted by an arcuate seat 153 which is formed in the lower portion of the afore-mentioned front end wall of the casing 149 and about the axis of the shaft 150, and a flange 154 formed at the lower end of the slide guide 134 along the arcuate surface of the seat 153 and provided with a stopper screw 155 which is capable of fastening the slide guide 134 to the seat 153 at a desired position within its pivotal range in a manner similar to the stopper screw 137.

What is claimed is:

1. A motor-driven welding machine comprising:
   a welding torch including a grip means and a nozzle pipe attached to said grip means;
   a carriage means having a torch mounting portion pivotally attached to a drive portion wherein said carriage has front and rear wheels provided in front and rear portions of said carriage means at least either said front or rear wheel being driven by a motor and said torch mounting portion being horizontally pivotable in order to permit said torch to rotate in a horizontal plane;
   an adjusting mechanism for locating the center of said grip means of said welding torch at a position intermediate between said front and rear wheels by an extensible means for varying the distance between said front and rear wheels; and
   a holder member for holding said welding torch in position on said welding machine.

2. A welding machine defined in claim 1, wherein said front wheels are selectively actuable for rotation with said torch mounting portion.

3. A welding machine as defined in claim 1, wherein said extensible means is constituted by a front wheel support member which is slidably engaged with a rear wheel support frame.

4. A welding machine as defined in claim 1, further comprising a second adjustment mechanism for varying the distance between a torch holding portion of said torch holder member and said front wheels.

5. A welding machine as defined in claim 1, further comprising a lift means for moving said torch holder member vertically to a desired level.

6. A welding machine as defined in claim 5, wherein said lift means comprises a slide member with a rack and a pinion fixedly mounted on a transverse rotatable shaft in meshing engagement with said rack.

7. A welding machine as defined in claim 6, wherein said shaft of said pinion has a spring mounted thereon for biasing said pinion in one particular direction for braking the rotational movement thereof.

8. A welding machine as defined in claim 6, wherein said shaft of said pinion is mounted through frame walls of said welding machine and provided at one end thereof with a rotating handle and at the other end with a clamping handle for anchoring said pinion shaft.

9. A welding machine as defined in claim 1, wherein said holder member is adapted to support said welding torch at three points on the circumference thereof, clampingly gripping said torch at one of said three points.

10. A welding machine as defined in claim 1, wherein said holder member consists of a polygonal ring having a clamping screw at one corner or side thereof.

* * * * *

UNITED STATES PATENT AND TRADEMARK OFFICE
CERTIFICATE OF CORRECTION

PATENT NO. : 4,328,412
DATED : May 4, 1982
INVENTOR(S) : Toshihiko Watanabe et al.

It is certified that error appears in the above-identified patent and that said Letters Patent are hereby corrected as shown below:

On the title page Insert:
--[30]  Foreign Application Priority Data

March 2, 1979   [JP]   Japan .....54/024980

March 2, 1979   [JP]   Japan .....54/026943

Sept. 18, 1979   [JP]   Japan .....54/129651

Column 6, line 63, change "clampler" to --clamper--.

Column 8, line 31, insert --welding-- before "torch" and change "fixedly" to --fixably--.

Column 9, line 27, change "stae" to --state--.

Signed and Sealed this

Thirty-first Day of August 1982

[SEAL]

Attest:

Attesting Officer

GERALD J. MOSSINGHOFF
Commissioner of Patents and Trademarks